Figure 1:
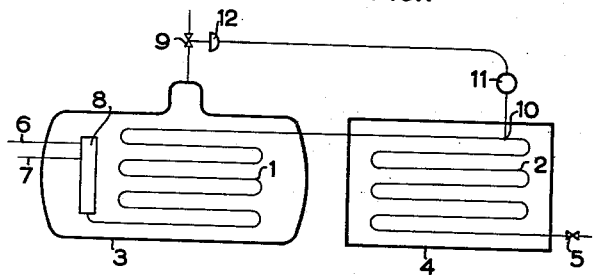

Sept. 24, 1963     L. J. ROTHKRANS     3,105,093
PROCESS AND APPARATUS FOR PREPARING UREA FROM $NH_3$ AND $CO_2$
Filed May 4, 1959

Inventor
Leonardus J. Rothkrans
By Cushman, Darby & Cushman
Attorneys

United States Patent Office 3,105,093
Patented Sept. 24, 1963

3,105,093
PROCESS AND APPARATUS FOR PREPARING
UREA FROM NH₃ AND CO₂
Leonardus J. Rothkrans, Geleen, Netherlands, assignor to Stamicarbon N.V., Heerlen, Netherlands
Filed May 4, 1959, Ser. No. 810,905
Claims priority, application Netherlands May 7, 1958
4 Claims. (Cl. 260—555)

The present invention relates to the two-stage preparation of urea starting from $NH_3$ and $CO_2$ wherein carbamate is first formed and the carbamate is thereafter converted into urea with the release of water.

It has previously been proposed to carry out a two-stage process of this type using equal pressures in the two stages while maintaining a higher temperature in the second stage than the temperature in the first stage.

In another modification, it has been suggested that only part of the $CO_2$ be fed into the first stage, another portion of the $CO_2$ being forced into the second stage through a by-pass conduit. With this latter modification, the temperature can be controlled in the second stage by varying the amount of $CO_2$ fed to the second stage. This is due to the strongly exothermic character of the reaction by which carbamate is formed. Thus, if less $CO_2$ is converted into carbamate in the first stage, a smaller amount of heat has to be withdrawn in this stage, while in the second stage the temperature can rise as a result of the increased feed of $CO_2$ and the consequent carbamate formation taking place therein. On the other hand, if more $CO_2$ is converted in the first stage, the decrease of the $CO_2$ feed to the second stage causes a smaller temperature rise in this second stage. Thus, as indicated, the temperature in the second stage may be influenced within certain limits by control of the amount of $CO_2$ supplied to the second stage.

There are several inherent disadvantages in the above-described method. For one thing, it is necessary to use a separate $CO_2$ by-pass conduit which is suitable for high pressures. This by-pass conduit of necessity must include an appropriate control valve for regulating $CO_2$ flow and, in operation, the opening of this valve is easily blocked up.

The principal object of the present invention is to provide an improved process for preparing urea whereby the abovementioned disadvantages are obviated. A more specific object of the invention is to provide a two-stage process for making urea wherein the temperature in the second stage is controlled by variation of the $CO_2$ supply to the second stage without the use of a by-pass conduit as heretofore necessary. Other objects will also be apparent from the description which follows:

According to the invention, all of the $CO_2$ to be reacted is supplied to the first stage. However, the removal of heat in the first stage is so controlled that only a part of the $CO_2$, e.g. 70 to 90% by weight thereof, is converted to carbamate in this stage. The unconverted $CO_2$, along with unreacted $NH_3$ and carbamate, is passed on to the second stage where the $CO_2$ can form additional carbamate. Owing to formation of urea and water the relation between pressure and temperature in the second stage differs from those in the first stage in such a way that a temperature rise becomes possible. The heat necessary for this temperature rise can be supplied by further carbamate formation in the second stage.

The present process can be carried out in a straightforward manner using a urea synthesis apparatus comprising a first reactor for the formation of carbamate, a water-filled cooling jacket surrounding the first reactor, a second reactor receiving unreacted $NH_3$, $CO_2$ and carbamate from the first reactor for the formation of urea therein, insulating means about the second reactor and means responsive to the temperature within the second reactor regulating the amount of heat withdrawn from the first reactor through the cooling jacket to thereby control the temperature, and consequently the amount of $CO_2$ reacted, in each reactor.

As a result of the exothermic character of the carbamate-forming reaction in the first reactor, the cooling jacket functions as a steam generator. The steam thus formed may be vented through an appropriate control valve in the manner discussed below to give the desired temperature control.

The insulated reactor, i.e. the second reactor, is equipped, at an appropriate position, with a suitable device for measuring the temperature therein. This temperature measuring device may be connected to an appropriate controller designated to emit an impulse at a desired temperature, e.g. 180° C., which determines the opening of the steam control valve for the cooling jacket.

It is also possible to use the impulse coming from the temperature controller indirectly for controlling the pressure in the cooling jacket. Thus, for example, the temperature controller may be operatively associated with a pressure controller which, in turn, operates the control valve.

Figure 2:
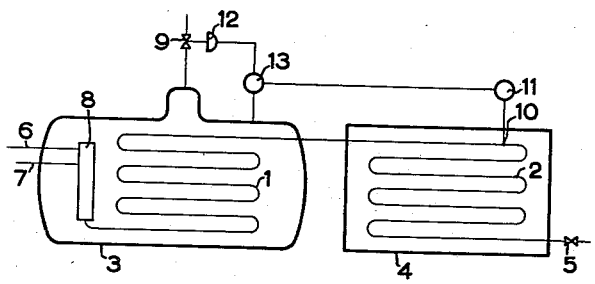

The aforementioned features of the invention are diagrammatically illustrated in FIGURES 1 and 2. More specifically, these figures show a tube system 1, surrounded by a water-filled cooling jacket 3 and a tube system 2 connected to the first system and positioned within a tank 4 filled with suitable insulating material. The tube system 1 serves as the carbamate reactor, the reaction components $NH_3$ and $CO_2$ being supplied through conduits 6 and 7, respectively, and a mixing compartment 8.

The carbamate produced in the tube system 1 and the free $NH_3$ and $CO_2$ which have not reached with each other, are passed from system 1 through the tube system 2. In tube system 2, more carbamate is formed and urea is produced from this. Thereafter a melt containing urea is drawn off through valve 5 and processed in the usual way.

The water-filled cooling jacket 3 actually operates as a steam boiler, from which the steam can escape through shut-off valve 9. In the embodiment shown in FIGURE 1, the tube system 2 is provided with a temperature controller 11. Typically, this controller may emit an impulse, if the temperature in system 2 deviates from a preset value, which operates the shut-off valve 9 of the cooling jacket 3 through an appropriate servomotor 12.

FIGURE 2 illustrates another way of operating according to the invention whereby an even more improved control of the shut-off valve 9 is obtained. Thus, according to FIGURE 2, the impulse emitted by the temperature controller 11 is received by the pressure controller 13, which operates the servomotor 12 of shut-off valve 9.

The manner in which the control system shown in FIGURES 1 and 2 operates is outlined below:

If the temperature in the tube system 2, as recorded by measuring device 10 is lower than the desired temperature of, e.g. 180° C., the valve 9 is caused to close further. As a result, the steam pressure in jacket 3 around the tube system 1 increases with a resulting rise in the temperature of the water and/or steam therein. This decrease the cooling effect on system 1 so that less carbamate is formed. Accordingly, more unreacted $CO_2$ is passed from system 1 into tube system 2 thereby forming more carbamate in system 2 and increasing the temperature therein by virtue of the exothermic carbamate-forming reaction. If, on the other hand, the temperature of the measuring device 10 increases to beyond 180° C., the above process is reversed, i.e. the valve 9 is opened wider, steam is vented therethrough and the cooling effect around system 1 is increased so as to permit increased carbamate formation therein.

It will be appreciated that the position of the measuring device 10 in the tube system 2 can be varied and is of secondary importance. Thus, for example, device 10 may be positioned towards the beginning or towards the end of the tube system 2 with equivalent results.

Use of the control feature of the invention makes it a relatively simple matter to maintain an optimum difference between the temperature in the tube system 2 and the temperature of the tube system 1, a difference of, for example, 20° C. Thus, by proper choice of the pressure and the $NH_3/CO_2$ ratio, the reaction by which urea is formed can be operated at maximum efficiency.

While the temperature used in the systems 1 and 2 can be varied, the control arrangement of the invention is normally set up to maintain temperatures of the order of 170 to 200° C., in system 2, preferably 180° C., as indicated heretofore, and 160 to 175° C., in system 1, the pressure in both systems being of the order of 180–200 atm.

Obviously various modifications may be made in the invention described herein without deviating from the scope thereof as set forth in the claims, wherein I claim:

1. In a continuous two stage process for preparing urea from $NH_3$ and $CO_2$ which comprises the steps of continuously supplying all of the $NH_3$ and $CO_2$ to be reacted to a first reaction zone, exothermally reacting the $NH_3$ and $CO_2$ to form ammonium carbamate in the first reaction zone and obtaining a reaction mixture containing carbamate and unreacted $NH_3$ and $CO_2$, feeding the resulting reaction mixture into a second reaction zone, reacting the remaining $NH_3$ and $CO_2$ in the second reaction zone to form additional carbamate and converting the carbamate therein to urea, the improvement which comprises providing a cooled first zone and an insulated second zone, continuously measuring the temperature of the reaction in the second zone and continuously controlling the cooling of the first zone by removing heat from the first zone and regulating the amount of heat removed therefrom, the continuous control and the regulation being responsive to the temperature measurement in the second zone whereby the temperature in the first zone is controlled within the range of 160° to 175° C. so that only from 70 to 90% by weight of the $CO_2$ is reacted in the first zone to control the $CO_2$ supply to the second zone and thereby control the temperature in the second zone within the range of 170° to 200° C.

2. The process of claim 1 that includes the improvement of maintaining a pressure in both zones in the order of 180 to 200 atmospheres.

3. The process of claim 1 wherein heat is removed from said first stage by indirect heat exchange with water.

4. The process of claim 3 wherein said water is converted to steam and the rate of the carbamate formation in said first stage is controlled by venting said steam according to the temperature in said second stage.

References Cited in the file of this patent

UNITED STATES PATENTS

| 1,402,338 | Backhaus | Jan. 3, 1922 |
| 1,937,116 | Hetherington | Nov. 28, 1933 |
| 2,038,564 | Hetherington | Apr. 24, 1936 |
| 2,632,771 | White | Mar. 24, 1953 |

FOREIGN PATENTS

| 958,503 | France | Sept. 12, 1949 |
| 973,011 | France | Sept. 6, 1950 |
| 522,822 | Belgium | Oct. 15, 1953 |
| 554,155 | Belgium | Jan. 31, 1957 |

OTHER REFERENCES

Frejacques: Chimie et Industrie, vol. 60, pages 22–30 (1948).